United States Patent

Chegolin et al.

[15] 3,651,309

[45] Mar. 21, 1972

[54] DEVICE FOR READING MULTICHANNEL OSCILLOGRAMS

[72] Inventors: Petr Mikhailovich Chegolin, ulitsa Kedyshko, 15-a, kv. 39; Gennady Vasilievich Rimsky, Akademicheskava, 23, kv. 15; Eduard Nikolaevich Leonovich, ulitsa Akademicheskaya, 23, kv. 12; Fridrikh Grigorievich Milner, ulitsa Opanskogo, 45, Korpus 7, kv. 108; Nikolai Nikolaevich Samuilov, ulitsa Tipografskaya, 21, kv. 13; Nikolai Nikolaevich Anishkevich, ulitsa Cheljuskintsev, 22, kv. 3, all of Minsk, U.S.S.R.

[22] Filed: Dec. 31, 1969

[21] Appl. No.: 889,619

[52] U.S. Cl. ....................................235/61.6 A, 250/219 QA

[51] Int. Cl. ..........................................G06k 7/10, G06k 9/12

[58] Field of Search .........235/61.6 A; 250/219 QA, 217 CR; 178/7.1; 356/165, 167

[56] References Cited

UNITED STATES PATENTS 2,931,566 4/1960 Strassner...........................235/61.6 A 2,932,016 4/1960 Dayonnet et al................250/219 QA 3,536,895 10/1970 Dedden et al.....................235/61.6 A

*Primary Examiner*—Maynard R. Wilbur

*Assistant Examiner*—Thomas J. Sloyan

*Attorney*—Waters, Roditi, Schwartz & Nissen

[57] ABSTRACT

A device for reading multichannel oscillograms comprising: a circuit for the automatic adjustment of the sensitivity of an amplifier in association with a recorded line registration photoelectric cell; a circuit for producing signals indicative of the zone where a gap between oscillographic curves becomes critical; a circuit for grouping data on the ordinates of curves that have been read off a tape and for feeding said data to an electronic computer for further processing; a circuit for counting timing marks and generating signals indicative thereof, and a circuit for adjusting the pitch of the curve sampling process. The device makes it possible to provide a speed of reading graphic information commensurate with that of an electronic computer which is being supplied with this information.

6 Claims, 3 Drawing Figures

DEVICE FOR READING MULTICHANNEL OSCILLOGRAMS

Figure 1:
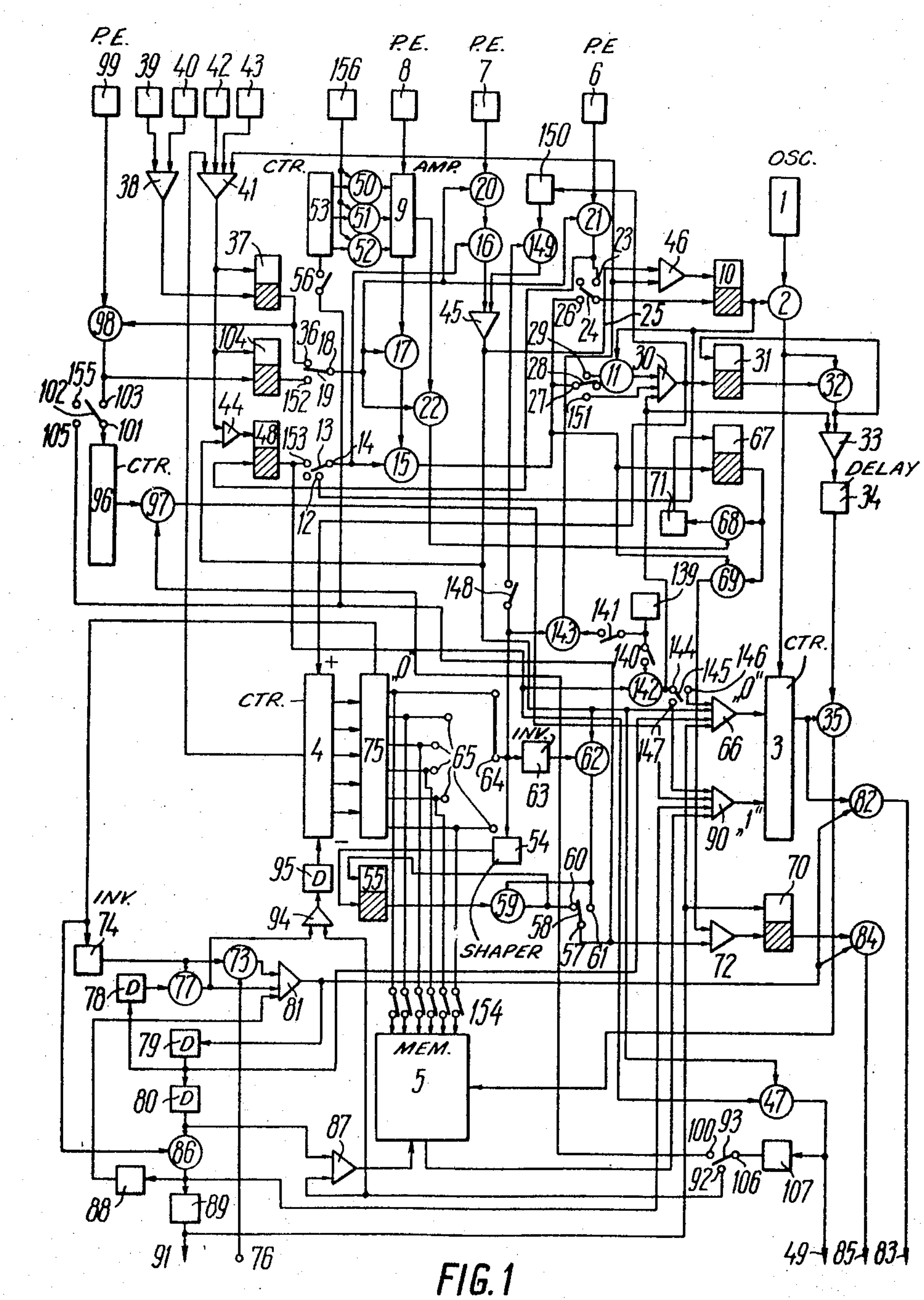

This invention relates to peripheral computer devices intended to automatically read graphic information recorded as visually observable curves on information-carrying tapes and to feed this information directly into electronic computers and, more particularly, to devices for reading multichannel oscillograms.

Known in the art are devices which automatically read graphic information and which comprise a recorded-line registration channel with photoelectric cells registering the start and finish of the zone being read and with photoelectric cells registering recorded lines, a driving pulse oscillator, an ordinate counter and a reversible curve counter having a decoder and a curve-number selector.

A major disadvantage of the known devices consists in that they comprise circuits which adjust the recorded line registration channel permanently for the given information-carrying tape. This makes it obligatory to provide for continuous manual tuning of the recorded line registration amplifier and requires the use of complex instruments, such as oscilloscopes, etc., for monitoring the quality of the adjustment of the device, and the help of highly skilled operators, since the information-carrying tapes differ drastically as far as their parameters are concerned (contrast, background, registration quality, etc.).

Another disadvantage of the known devices is the absence of adjustable circuits which shape signals indicative of the zone where intersecting curves approach one another at a critical distance. The result is that the extrapolation onset signal is produced regardless of the curve convergence angle only after the gap between the front edges of the curves reaches a certain fixed value. Hence, when the curve convergence angle is small, this signal will be produced long before reaching the point where the curves actually intersect. This makes the computer waste its operating time to identify the intersecting curves.

Still another disadvantage of the known devices is that their operating speed is too low when compared to that of computers. Hence, the time required for the information input is prohibitively great.

Yet another disadvantage of the known devices is the absence of a circuit for counting the number of timing marks and generating signals indicative thereof. This circuit controls the operation of the device in case the information-carrying tape carries timing marks made as vertical lines. Hence, the absence of such a circuit makes it impossible to eliminate reading errors caused by the non-uniformity of the longitudinal transportation speed of the tape during the write-read procedure.

Additionally, the known devices do not have means for automatically controlling the pitch of sampling the graphical information along the information-carrying tape. Hence, the reading in such devices goes on at a constant sampling pitch irrespective of the nature of the process which can be either a high frequency one or a low frequency one. Thus, a small pitch will result in a computer memory overload when slow-varying processes are being sampled and a great pitch will bring about considerable losses of information and misses of curve intersection points in case the sampling is done on tape sections where quick-varying processes have been recorded.

Finally, a considerable disadvantage of the known devices consists in the absence of circuits to eliminate errors appearing in the process of timing mark reading as well as in the absence of circuits for accurately setting the length of the tape section from which the information is to be read off when the tape is being transported continuously. Hence, it is impossible to eliminate reading errors caused by the inertia of the tape transport mechanism when it is fed with a signal to stop reading from the given timing mark.

An object of the present invention is to provide a device for reading multichannel oscillograms which comprises means for automatic readjustment of the sensitivity of the recorded line registration channel, an adjustable circuit to indicate the zone of critical approach of intersecting curves, means for grouping the data being fed to computers, means for counting timing marks and for producing signals indicative of the number of the marks, means for automatic control of the sampling pitch along the tape in accordance with the nature of the recorded process and means for eliminating reading errors which appear when the information-carrying tape is transported continuously.

With the above and other objects in view, the present invention provides a device for reading multichannel oscillograms comprising means for registering recorded lines with the use of photoelectric cells which register the start and finish of the zone being read and the recorded lines, a driving pulse oscillator, an ordinate counter connected with the driving pulse oscillator, a reversible counter of the number of oscillographic curves provided with a decoder and a curve-number selector, as well as a buffer memory device connected with said counters, a circuit for automatic readjustment of the sensitivity of the amplifier of the photoelectric cell which registers recorded lines, the said circuit containing gates feeding preset bias voltages to the amplifier of the photoelectric cell, a counter of measurement errors with a decoder whose output buses are connected to the control inputs of said gates and a pulse shaper whose input is connected to the common point of the curve-number selector and whose output is connected to the input of a trigger indicating short-duration failures and controlled by its own gate through which the photoelectric cell indicating the finish of the zone being read is connected to the 0-input of the same trigger and to the complementing input of the measurement error counter.

Thus, the recorded-line registration channel can be automatically adjusted in accordance with the parameters of the information-carrying tape of any background and of any quality.

To reduce the amount of machine time required for identification of intersecting curves it is advisable that the device should comprise a circuit which shapes a signal to indicate the zone of critical curve convergence and uses a curve convergence trigger, two gates and a curve extrapolation trigger, the 1-input of the curve convergence trigger being connected to the first output of the amplifier of the recorded line registration photoelectric cell where a signal appears at the moment when the scanning beam passes the front edge of the curve that is being read off, and the 1-output of the curve convergence trigger being connected to the control inputs of the two gates one of which has its second input connected to the first output of the amplifier of the recorded line registration photoelectric, cell while the second gate is connected to the second output of the same amplifier where a signal appears at the moment when the scanning beam passes the read edge of the curve that is being read off, while at the same time the output of the first of the gates is connected to the 1-input of the extrapolation trigger and the output of the second gate is connected via an adjustable delay circuit to the 0-input of the curve convergence trigger.

To reduce the time required for the input of the data, that have been read off, into an electronic computer and to match the operating speed of the computer with that of the device for reading multichannel oscillograms, it is advisable that this device should comprise a circuit for grouping the ordinates of curves that have been read off, containing an initiation gate whose control input is connected, via an inverter, to the 0-bus of the decoder of the curve-number reversible counter and whose second input is connected to the interogation bus of the computer which is fed with the read-out data; a circuit operation cycling gate whose control input is connected to said inverter, whose second input is connected to the output of a delay circuit and whose output is connected to the subtract input of the reversible counter, as well as an OR-gate whose inputs are connected to the output of the initiation gate and to the output of the operation cycling gate respectively, and whose output is connected to the input of the second delay circuit and to code-out gates whose control inputs are connected to the output of the ordinate counter and to the extrapolation trigger, while the output of the second delay circuit is connected to the input of the first delay circuit, to the 0-inputs of the ordinate counter and, via the third delay circuit, to the gate which is controlled from the 0-bus of the decoder of the reversible counter and which is connected to the start bus of the computer, and while the output of the third delay circuit is connected to the interrogation bus of the buffer memory whose outputs are connected to 1-inputs of the ordinate counter and whose control buses are connected via switches, to the output buses of the decoder of the reversible counter.

To eliminate errors occurring in the process of curve ordinate measurements due to the non-uniformity of longitudinal transportation of the tape carrying timing marks as well as to provide the possibility of reading the given section of the tape and of tying-in the read-out ordinates to the common timing system in the course of information writing and and reading, it is advisable that the device for reading multichannel oscillograms should comprise a circuit for counting and producing timing marks containing a timing mark counter, gates controlled by this counter and intended to indicate the number of timing marks and a gate connected to the photoelectric cell registering the timing marks and controlled by the trigger starting the device, the output of the gate being connected to the complementing input of the timing mark counter and to the 1-input of the start trigger which controls the blocking of the photoelectric cells registering the start and finish of the zone being read and the recorded lines, while then outputs of the trigger producing signals indicative of the timing mark numbers should be connected to the 1-inputs of the ordinate counter and the pulse inputs of said trigger should be connected, via a delay circuit, to the output of the gate producing a signal indicating that the ordinates are ready to be into the computer.

To make the operation of the device self-adaptive as far as the sampling pitch along the tape is concerned, with a view to eliminating both the information redundancy when the reading-out is performed at a small sampling pitch and the information losses when the reading is performed at a great sampling pitch as well as with a view to increasing the reliability of fixing the curve intersection points along the tape, it is advisable that the device for reading multichannel oscillograms should comprise a sampling pitch shaping counter whose complementing input is connected to the photoelectric cell registering the start of the zone being read and whose 1-inputs are connected to the terminals of complementary switches the common points of which are connected to the outputs of gates controlled respectively by signals from the 0- and 1-inputs of said extrapolation trigger, the inputs of these gates being connected, via an OR-gate, to the stop bus of the device and to the photoelectric cell registering the finish of the zone being read, while the 1-output of the sampling pitch shaping counter should be connected to one input of the start gate, whose second input should be connected to the 1-output of the start trigger and the third input should be connected to the photoelectric cell registering the start of the zone being read.

To eliminate errors occurring in the process of reading of the timing marks and to insure reversible transportation of the information-carrying tape, it is advisable that the device for reading multichannel oscillograms should comprise a timing mark trigger, a reversing trigger and a second photoelectric cell registering the timing marks and located at a certain distance from the first photoelectric cell, the second photoelectric cell connected to the 1-input of the timing mark trigger, while the first photoelectric cell should be connected to the input of the timing mark counter via a gate controlled by the timing mark trigger and to the 0-input of the timing mark trigger via a delay circuit and the output buses of the decoder of the timing mark counter should be connected to the terminals of the switch whose common point is connected, via a shaper, to the 0-input of the motor reversing trigger and to the first input of a gate, the second input of which is connected to the second photoelectric cell while the output of which is connected to the 1-input of the motor reversing trigger whose outputs are connected to the input of the time marking trigger and to the input of the unit controlling the direction of rotation of the motor drive which transports the tape with the recorded oscillogram.

Figure 2:
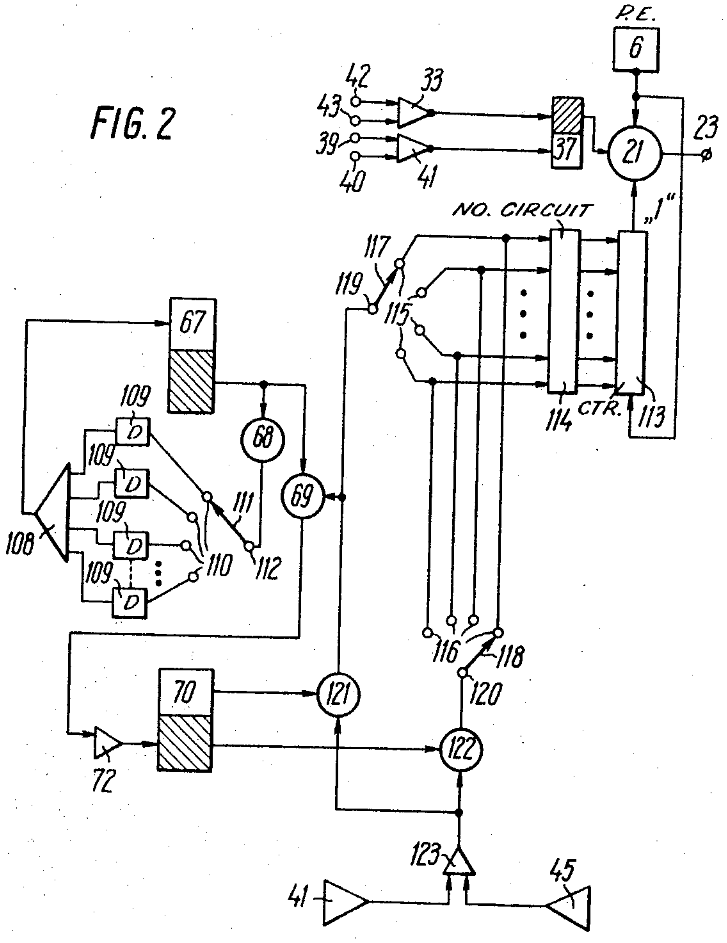
Figure 3:
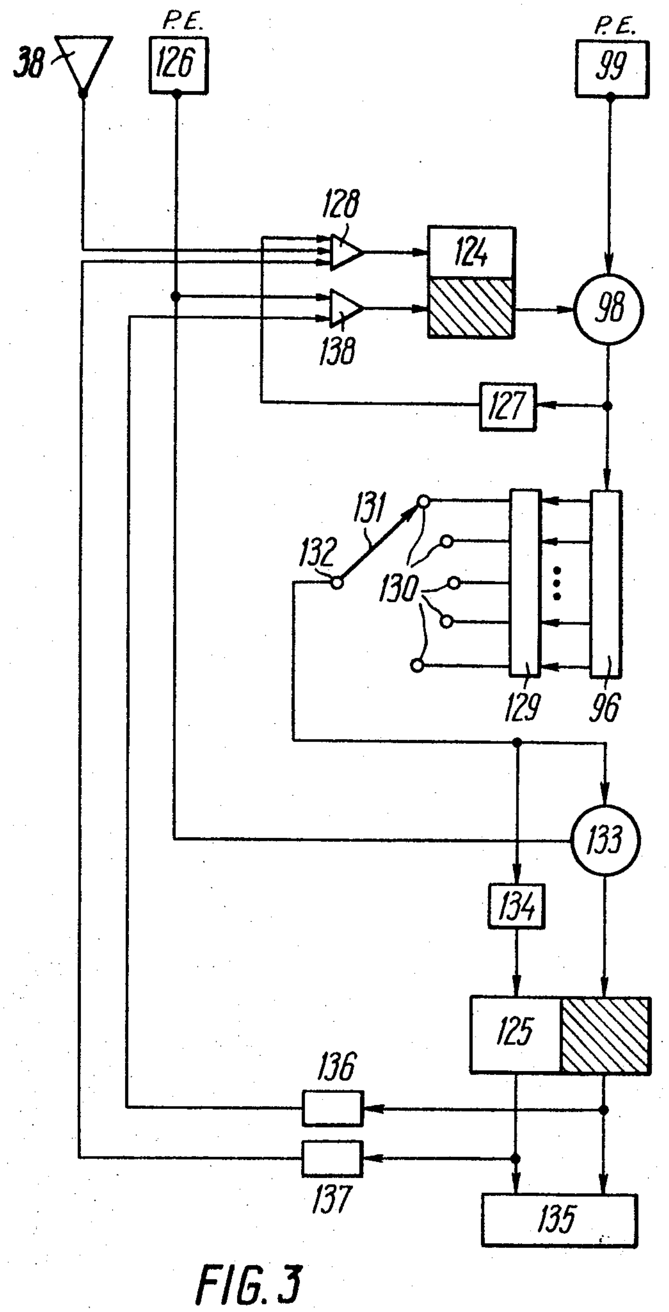

Other objects and advantages of the present invention will be apparent from the following description of its embodiment given b way of example and from the accompanying drawing, in which:

FIG. 1 is a functional diagram of the device for reading multichannel oscillograms according to the invention;

FIG. 2 is a diagram of the circuit shaping signals indicative of the critical curve-approach zone and providing automatic readjustment of the sampling pitch in the process of curve read-out, according to the invention, and FIG. 3 shows a diagram of the circuit eliminating errors which occur when timing marks are read off and insuring the reversible transportation of the information-carrying tape, according to the invention.

A device for reading multichannel oscillograms recorded on an information-carrying tape comprises a unit registering recorded lines, a driving pulse oscillator 1 (FIG. 1), connected to a gate 2 whose output is connected to the complementing input of an ordinate counter 3, a reversible counter 4 which counts the number of oscillographic curves, and a buffer memory device 5 connected to the counters 3 and 4. The recorded-line registration unit comprises photoelectric cells 6 and 7 used to register the start and the finish of the zone being read, respectively, a photoelectric cell 8 used to register the recorded lines and an amplifier 9 of the photoelectric cell 8. The amplifier 9 of the recorded line registration cell 8 can be a known pulse amplifier with a controllable gain factor which varies under the influence of the bias voltage (control voltage). An amplifier can be cited as an example, which is made as a balance circuit having load resistors shunted by transistors. Varying the degree of opening of the shunting transistors with respect to collector current by applying control voltage to the bases of the transistors, it is possible to alter the internal resistance of the shunting resistors in proportion to the control voltage. The total resistance of the collector resistors of the balance amplifier also varies in proportion to the value of the control voltage, with the result that the gain factor of the balance amplifier changes in proportion to variations of the total collector resistance. The second input of the gate 2 is connected to the 1-output of a trigger 10, to control input of a gate 11 and a terminal 12 of a switch 13 used to select the required mode of the curves ordinates counting. A common point 14 of the switch 13 is connected to the control inputs of gates 15 and 16. The second input of the gate 15 is connected to the output of a gate 17 whose control input is connected to the output of the amplifier 9 and whose second input is connected to a common point 18 of a switch 19. The second input of the gate 16 is connected to the output of a blocking gate 20 whose control input is connected to the common point 18 of the switch 19 as well as to the control inputs of gates 21 and 22. The second inputs of the gates 21 and 22 are connected to the photoelectric cells 7 and 6 used to register the finish and the start of the zone being read. The output of the gate 21 is connected to a terminal 23 of a switch 24. A common point 25 of the switch 24 is connected to the 1-input of the trigger 10 and a terminal 26 of the switch 24 is connected to the output of the gate 15 and a common point 27 of a switch 28. A terminal 29 of the switch 28 is connected to the second input of the gate 11 whose output is connected to an input of an OR-gate 30. The output of the OR-gate 30 is connected to the 1-input of a trigger 31 and to the positive input of the reversible counter 4.

The 1-output of the trigger 31 is coupled with the control input of a gate 32 whose second input is connected to the output of the gate 2 and whose output is connected to the 0-input of the trigger 31 and, via an OR-gate 33 and a delay circuit 34, to the inputs of gates 35 whose second inputs are connected to the 1-outputs of the triggers in the ordinate counter 3 (to simplify the drawing only one gate 35 is shown). The outputs of the gates 35 are connected to code-buses of the buffer memory 5.

A terminal 36 of the switch 19 is connected to the 1-output of a start trigger 37 whose 1-input is coupled with the output of an OR-gate 38, the input of the gate 38 being connected with buses 39 and 40 used to trigger the device for reading multichannel oscillograms either from a control panel or from the computer being fed with the read-out information, respectively. The 0-input of the trigger 37 is coupled with the output of an OR-gate 41 whose inputs are connected to buses 42 and 43 used to stop the device either from the control panel or from the computer, respectively. The output of the OR-gate 41 is connected also to the input of an OR-gate 44. Connected to the second input of the OR-gate 44 are the output of an OR-gate 45, the input of an OR-gate 46 and the input of a gate 47 indicating the ordinate readiness. The input of the OR-gate 45 is coupled with the output of the gate 16. The output of the OR-gate 46 is coupled with the 0-input of the trigger 10, the second input of the gate 47 is connected to the 1-output of a trigger 48 and the output of the gate 47 is connected to a bus 49 of the computer, the bus providing the ordinate-readiness signal. Connected to the 0-input of the trigger 48 is the output of the OR-gate 44 and connected to the 1-input of the same trigger is the output of the gate 21.

According to the invention, the device comprises a circuit for automatic readjustment of the sensitivity of the amplifier 9 in the photoelectric cell 8 used to register recorded lines. The circuit comprises gates 50,51 and 52 which feed the amplifier 9 with preset bias voltages, a counter 53 of measurement errors with a decoder, a pulse shaper 54 and a trigger 55 which indicates short-duration failures. The output buses of the counter 53 are connected to control inputs of the gates 50, 51, 52, while the complementing input of the counter 53 is connected, via a switch 56, to a common point 57 of a switch 58.

The trigger 55 controls the operation of a gate 59 whose output is connected to a terminal 60 of the switch 58 and to the 0-input of the trigger 55. The second input of the gate 59 is connected to a terminal 61 of the switch 58 and to the output of a gate 62 which is connected, via an inverter 63, to a common point 64 of a curve-number selector 65. Connected to the same point 64 of the selector 65 is the input of the pulse shaper 54 whose output is coupled with the 1-input of the trigger 55.

The second input of the gate 62 is connected to the output of the OR-gate 45 and with the input of an OR-gate 66 whose output is connected to the 0-input of the ordinate counter 3.

The device comprises also a circuit which shapes signals indicative of the curve critical approach zone and which uses a curve convergence trigger 67, gates 68 and 69 and a curve extrapolation trigger 70. The 1-input of the convergence trigger 67 is connected, via the gates 15 and 17, to the first output of the amplifier 9; the output producing a signal at the moment when the scanning beam passes the front edge of the curve that is being read-off. The 1-output of this trigger 67 is connected to the control inputs of the gates 68 and 69. The output of the gate 68 is connected, via an adjustable delay circuit 71, to the 0-input of the trigger 67, while the second input of the gate 68 is connected, via the gate 22, to the second output of the amplifier 9; the output producing a signal at the moment when the scanning beam passes the rear edge of the curve that is being read-off.

The second input of the gate 69 is connected to the 1-input of the trigger 67, while the output of the gate 69 is connected, via an OR-gate 72, to the 1-input of the extrapolation trigger 70. The second input of the OR-gate 72 is connected to the common point 57 of the selector 58.

To reduce the time required for the input of the read-off data into a computer, it is advisable that the device should comprise a circuit for grouping the ordinate information before it is fed to the computer. The circuit contains an initiation gate 73 whose control input is connected, via an inverter 74 with the 0-bus of a decoder 75 of the reversible counter 4 and whose second input is connected to an interrogation bus 76 of the computer which is being fed with the read-out information. The decoder 75 is a selective circuit having a separate output for each set of input variables. The decoder is constructed as a combination circuit comprising AND-gates. The decoder inputs are connected with all the zero and unit outputs of the flip-flops of the counter 4. The read-off device comprises a single-stage decoder based on semiconductor diodes. The circuit contains also an operation cycling gate 77 whose control input is connected to an inverter 74 and whose second input is connected to the output of a delay circuit 78. The input of the delay circuit 78 is coupled with the output of a delay circuit 79, with the input of a delay circuit 80 and with the input of the OR-gate 66. The input of the delay circuit 79 is coupled with the output of an OR-gate 81, with pulse inputs of gates 82 which feed the computer, through buses 83, with coded signals from the ordinate counter 3 and with the input of a gate 84 which feeds the computer, through a bus 85, with the extrapolation instructions.

The second input of the gate 84 is connected to the 1-output of the trigger 70.

The outputs of the gates 73 and 77 are connected to the inputs of the OR-gate 81. The output of the delay circuit 80 is coupled with a gate 86 and with the input of an OR-circuit 87. The second input of the gate 86 is connected to the 0-bus of the decoder 75 while the output of the gate 86 is connected to delay circuit 88 and 89 and to an OR-gate, the output of the OR-gate 90 being connected to 1-inputs of the ordinate counter 3. The output of the delay circuit 88 is coupled with the input of the OR-gate 81 while the output of the delay circuit 89 is coupled with the input of the OR-gate 66, with the 0-input of the trigger 70 and with a bus 91 which initiates the computer program after the computer has been fed with the information read off the oscillograms.

The output of the OR-gate 87 is connected to the interrogation bus of the buffer memory 5 while the second input of this gate is connected to a terminal 92 of a switch 93 and to the input of an OR-gate 94 second input is connected to the output of the gate 77 and whose output is connected, via a delay circuit 95, to the subtract input of the counter 4.

To eliminate errors occuring in the process of curve ordinate measurements caused by the non-uniformity of the longitudinal transportation speed of the tape which bears timing marks, the device comprises a circuit which counts up timing marks and produces signals indicative of their numbers. The circuit contains a timing mark counter 96, gates 97 which are controlled by the counter 96 and produce signals indicative of the numbers of marks and a gate 98 which is connected to a photoelectric cell 99 performing the registration of timing marks.

The outputs of the triggers of the timing mark counter 96 are connected to the control inputs of the gates 97 whose pulse inputs are connected to a terminal 100 of the switch 93 while the outputs of the gates 97 are connected to the input of the OR-gate 90.

The complementing input of the counter 96 is connected to a common point 101 of a switch 102 whose terminal 103 is connected to the output of the gate 98 and to the 1-input of a start trigger 104. A terminal 105 of the switch 102 is connected to the common point 57 of the selector 58.

The input of the gate 98 is coupled with the photoelectric cell 99 while the second input of this gate is connected to the 1-output of the start trigger 37.

A common point 106 of the switch 93 is connected to the output of a delay circuit 107 whose input is connected to the output of the gate 47. The relationship between the cells 6–8 and 99 is as follows. The photoelectric cell 6 is intended for registering the start of the tape read-off, the cell 7 serves to register the end of the tape read-off; the cell 8 is provided to read-off curves located in the read operating zone, and the cell 99 serves to read the timing marks located beyond the read operating zone. As the information carrying tape is scanning beam passing the curve read level running approximately 10 mm. from the tape edge, the cell 6 produces a pulse corresponding to the start of the reading of curves of the information carrying tape. Subsequently the scanning beam moves along the tape on which graphs are recorded. As the scanning beam intersects the graph lines, the cell 8 registering the recording lines generates signals whose duration is proportional to the thickness of the curve lines. As the scanning beam passes the level located 10 mm. from the other edge of the tape, the cell 7 generates a pulse corresponding to the end of reading of the curves in the read operating zone. The 10-mm. zones along the tape edges of the information carrying tape, therefore, are not operatively used and can be used for recording auxiliary information, such as timing marks, thereon. Timing marks are read off with the help of the cell 99, which produces timing mark signals only when the tape is transported.

FIG. 2 presents a diagram of a circuit which produces signals indicative of the curve critical approach zone and a diagram of a circuit which automatically varies the curve sampling pitch. The first of these circuits contains a delay circuit arranged around an OR-gate 108 whose output is connected to the 0-input of the trigger 67 and whose inputs are coupled to the outputs of delay circuits 109. The inputs of these circuits 109 are connected to terminals 100 of a switch 111 whose common point 112 is connected to the output of the gate 68.

The circuit which automatically varies the sampling pitch contains a counter 113 shaping signals indicative of the sampling pitch, the complementing input of the counter being connected to the photoelectric cell 6. The 1-inputs of the counter 113 are connected, via a preset numbers circuit 114, to terminals 115 and 116 of switches 117 and 118, respectively. Common points 119 and 120 of the switches 117 and 118 are connected to the outputs of gates 121 and 122, respectively. Besides, the output of the gate 121 is connected to the input of the gate 69. The pulse inputs of the gates 121 and 122 are connected, via an OR-gate 123, to the output of the OR-gate 41 (FIG. 1) and to the output of the OR-gate 45. The second inputs of the gates 121 and 122 are connected to the 0- and to the 1-outputs of the trigger 70, respectively (FIG. 2). The circuit 114 is a combination of OR-gates arranged at the unit inputs of the flip-flops of the counter 113. The inputs of the OR-gates are connected to the terminals 116 of the switch 118. These OR-gates serve to set definite fixed codes in the reversible counter 113 in response to signals from the gate 122 via the switch 118.

The 1-output of the counter 113 is connected to the third control input of the gate 21.

To eliminate errors occurring when the timing marks are being read off and to insure reversible transportation of the continuously moving information-carrying tape, the device comprises a trigger 124 (FIG. 3) which produces signals indicative of timing marks, a trigger 125 which controls the reversing of the tape transportation direction and a second photoelectric cell 126 which registers the timing marks. The design of the device provides for a transverse gap between the photoelectric cells 99 and 126 to be selected in accordance with the maximum allowable noise level within the timing mark zone. In the longitudinal direction the photoelectric cell is mounted so as to be slightly ahead of the tape transportation.

The 1-output of the timing mark trigger 124 is connected to the third input of the gate 98 whose output is connected to the complementing input of the counter 96 as well as, via a delay circuit 127, to the input of an OR-gate 128. The counter 96 contains a decoder 129 whose outputs are connected to terminals 130 of a switch 131 the common point 132 of which is connected to the control input of a gate 133 and to the input of a pulse shaper 134. The outputs of the latter gate and of the pulse shaper are connected to the 1- and the 0-inputs of the reversing trigger 125. The outputs of the trigger 125 are connected to a unit 135 which controls the rotation of the motor drive transporting continuously the tape with the oscillogram recorded on it. Besides, the outputs of the trigger 125 are connected, via pulse shapers 136 and 137, to the input of an OR-gate 138 and to the input of the OR-gate 128, respectively. Connected also to the input of the OR-gate 128 is the output of the OR-gate 38. The outputs of the OR-gates 128 and 138 are connected to the 0- and to the 1-inputs of the timing mark trigger 124. The decoder 129 is a selective circuit similar to the decoder 75 and is made as a single-stage decoder comprising semiconductor diodes.

The unit 135 controlling the direction of rotation of the drive electric motor is a simple switch which switches over the windings of the tape-drawing motor in order to alter the direction of rotation of the motor rotor.

To insure the adjustment of the device for reading multichannel oscillograms it, comprises a circuit for checking whether the buffer memory operates correctly as well as a circuit for checking whether the reading is properly performed.

The operation check-out circuit comprises a pulse oscillator 139 (FIG. 1) and connected to it, via switches 140 and 141, gates 142 and 143. The second input of the gate 142 is connected to the 1-output of the trigger 48 while the output of the gate 142 is connected to the inputs of the OR-gates 30 and 33 and to a common point 144 of a switch 145 whose terminals 146 and 147 are connected to the OR-gates 66 and 90, respectively. The second input of the gate 143 is connected to the common point 64 of the switch 65 while the output of the gate 143 is connected to the inputs of the OR-gates 41 and 46.

The reading check-out circuit comprises a switch 148 via which the common point 64 of the switch 65 is connected to an input of a gate 149, a second input of the gate being connected, via a delay circuit 150, to the output of the OR-gate 30.

The output of the gate 149 is connected to the input of the OR-gate 45.

The following are the principal modes of operation of the device.

1. Operation with fixed reading level and generation of timing marks.

Before starting the device its switches should be operated to the following positions: switch 24 to terminal 23; switch 28 to terminal 151; switch 19 to terminal 152; switch 19 to terminal 152; switch 102 to terminal 103; switch 13 to terminal 153 and switch 93 to terminal 100. The switches 140 and 141 are open and the switch 65 is operated to the position which corresponds to the number of curves recorded on the tape. The switch 148 can be open if the buffer memory should store all the information read off by the device and if the number of signals arriving from the photoelectric cell 8 does not exceed the capacity of the memory 5, or it can be closed if it is required that a preset number of curves should be read off. The switch 58 is operated either to the terminal 60 if the curves to be read off the tape intersect one another, or to the terminal 61 if the curves are not intersecting. In the last case, one can use switches 154 so as the buffer memory 5 would store only the given preset curves.

When the start signal arrives either along the bus 40 or bus 39 from the control panel, the start trigger 37 changes to "1" and the gate 98 opens. The photoelectric cell 99 which registers the timing marks starts producing pulses which are fed to the counter 96 to change the trigger 104 to "1", due to which the gates 20,21,17 and 22 become open. A signal which is produced by the photoelectric cell 6 registering the start of the zone being read and which corresponds to a certain fixed reading level passes through the gate 21 and makes the trigger, 10 and 48 change to "1". These two triggers open the gates 2, 11, 15, 142 and 47. The ordinate counter 3 starts receiving and counting up pulses from the driver oscillator 1. At the moment when the scanning beam crosses the recorded line, the photoelectric cell 8 produces a signal which passes through the gates 17 and 15, switch 28 and the OR-gate 30 to make the trigger 31 change to "1". The same signal, picked from the OR-gate 30, is fed to the counter 4 and is added up there.

According to the code written in the counter 4, decoder 75 produces an output signal which appears at the respective bus (at the first bus from the first pulse, at the second bus from the second pulse, etc.) and which allows the memory 5 to start recording the code. By this time the signal from the gate 2 has passed through the gate 32 opened by the trigger 31, through the OR-gate 33 and through the delay circuit 34 required to compensate for transients in the counters 3 and 4 which are caused by the signal from the photoelectric cell 8. This signal transfers the curve ordinate code from the counter 3 via gates 35 to the memory 5 where the code is written down in the given address. The following ordinates of the curve are stored in the memory in a similar manner. At the moment when the scanning process within the zone being read is over, the photoelectric cell 7 produces a signal which passes through the gates 20 and 16 and the OR-gate 45 to be fed to the gate 62, to the 0-inputs of the triggers 10 and 48, to the trigger of the counter 3 and to the gate 47.

Here, the counter 3 drops to zero and the reading control circuit operates. If the number $N_n$ of the curves that have been counter by the device is equal to the number $N_y$ of curves preset in the switch 65, the gate 62 which is controlled through the inverter 63 will be closed and no signal will be fed to the extrapolation trigger 70. That means that the reading procedure has been carried out correctly.

If the number $N_n$ differs from the number $N_y$, the gate 62 will produce an output signal to be applied to the terminal 61 and the gate 59, the gate 59 being employed only when the device operates in the intersecting curve reading mode. In case the device has been set to operate in the non-intersecting curve reading mode, the signal from the gate 62 will make the extrapolation trigger 70 change to "1", which will mean that a reading error has occurred. In case the device has been set to operate in the intersecting curve reading mode (switch 58 has been closed to terminal 60), the signal indicative of a short duration failure will pass through the gate 59 only in case $N_n$ exceeds $N_y$, since the trigger 55 is made to change to "1" only when the counter 4 passes over the preset number $N_y$ and when the pulse shaper 54 is triggered by a signal passing through the switch 65.

After the signal from the delay circuit 107 makes the counter 3 drop to zero, the code of the timing mark counter 96 is delivered to the counter 3 via the gates 97. As mentioned above, the signal of ordinate read-out readiness is produced at the end of the zone being read. If no signal from the photoelectric cell 6 appeared at the start of the procedure, the trigger 48 will continue to keep "0", the gates 15 and 16 will be closed and no readiness signal will produced. Hence, the blocking of the gates 15 and 16 makes it possible to avoid reading errors at the start of the procedure.

As soon as the readiness signal is fed to the computer the latter will stop performing the calculation program and start receiving information from the device. To initiate the procedure, an interrogation signal is fed to the bus 76. This signal is applied to the gate 73 which at this moment is open since it is controlled from the 0-bus of the decoder 75 via the inverter 74. On passing through the gate 73 and the OR-gate 81, the interrogation signal is applied to the read-out gates 82 and 84 to start the process of feeding the computer with timing marks. Simultaneously, the signal from the OR-gate 81 is fed to the delay circuit 79. The delayed signal makes the trigger of the counter 3 change to "0" and then passes to the delay circuits 78 and 80. On passing through the delay circuit 80, this signal is applied, via an OR-gate 87, to the buffer memory 5 which feeds the counter 3 with the ordinate code, while on passing the delay circuit 78, whose delay is preset according to the time required by the computer to write a code from the summer into the internal memory, as well as the gate 77 and the OR-gate 81, this signal makes the counter 3 deliver the ordinate code to the computer. Simultaneously, the signal from the gate 77 is applied, via the OR-gate 94, to the delay circuit 95. After the ordinate is read-out into the computer, the code in the counter 4 becomes one bit shorter, which causes a readdressing in the buffer memory 5. Further input of curve ordinates from the device to the computer continues in a similar manner.

When all the recorder curve ordinates are read out, the counter 4 will have zero information, the gates 73 and 77 will close and the gate 86 will open. A signal from the delay circuit 80, having passed through the gate 86, will introduce into counter 3, via OR-gate 90, a marker code "111...1" which is carried by the signal from the delay circuit 88 and via the OR-gate 81 to the computer to identify the reading limit in the course of the given scan.

After the marker code is received, the device will be reset to its initial state by a signal from the delay circuit 89, and the computer will be ordered, by a signal via the bus 91, to continue the basic calculations in accordance with its program.

When the device is used to read the ordinates of curves which approach one another to a certain preset distance and which can, in all probability, be considered ultimately either to intersect or to converge, the circuit indicating the zone of critical approach will produce in the device an additional signal which is fed to the trigger 70 via the OR-gate 72 to produce an extrapolation instruction in the computer.

The circuit operates as follows. When the scanning beam passes the beginning of every curve to be read, the first channel of the amplifier 9 will produce a signal which is fed, via gates 17 and 15, to the gate 69 and to the 1-input of the trigger 67. The gate 69 will be closed unless the trigger 67 has changed to "1".

When the scanning beam passes the end of the curve, a signal produced by the second channel of the amplifier 9 will pass through the gates 22 and 68 and, after a delay, will change the trigger 67 to "0". In case the signal from the first channel of the amplifier 9 arrives via the gates 17 and 15 before the trigger 67 returns to "0", this signal will be routed via the gate 69 to change the trigger 70 to "1". That means that curves have approached one another to the preset distance and there is a certain probability that they will intersect. The device therefore produce an extrapolation instruction.

2. Operation with counting from a first curve being read in the absence of timing marks on information-carrying tape.

Before starting the device, its switches should be operated to the following positions: switch 24 to terminal 26, switch 28 to terminal 29, switch 19 to terminal 36, switch 102 to terminal 105, switch 13 to terminal 12 and switch 93 to terminal 92.

When the start signal arrives, the trigger 37 changes to "1" and opens the gates 20,21,17 and 22. As soon as the signal from the photoelectric cell 6 arrives, the trigger 48 changes to "1". The first signal from the photoelectric cell 8 passes through the gates 17 and 15 and the switch 24 and changes the trigger 10 to "1". From this moment on, the signals of the oscillator 1 start being fed to the ordinate counter 3. Hence, the ordinates of curves will be measured beginning with the first curve recorded on the tape. The further operation of the device is similar to what has been described above.

In this mode of operation, the timing mark counter 96 can be employed to count reading errors during every scanning process, or it can be disconnected from the circuit altogether by the switch 102 mounted on a terminal 105. In the latter case, the computer will be fed only with the codes of curve ordinates. At the end of the scanning of the zone being read by a signal from the delay circuit 107, the counter 3 is immediately fed with the ordinate of the curve, via the OR-gate 87, which is read out from the buffer memory 5. After that the code in the counter 4 becomes one bit shorter due to the delay circuit 95. The further operation of the device goes on just as in the first mode.

3. Adjustment mode.

The device comprises means for automatic gain control of the amplifier 9 to adjust it to the parameters of the particular information-carrying tape. This is done by feeding the voltage from a supply 156 to the first stages of the amplifier 9 via the gates 50,51 and 52 which are controlled by the measurement error counter 53 provided with a decoder.

The initial adjustment is carried out with the help of the oscillator 139, switch 141, 140 and 145 and the gates 143 and 142. The switches 140 and 145 are used to check whether the buffer memory 5 operates correctly. When the switch 140 is closed, pulses from the oscillator 139 start arriving to the gate 142 which is controlled by the trigger 48 and will operate only during the reading zone scanning procedure. As soon as the gate 142 becomes open, the pulses from the oscillator 139 will be applied to the switch 145 and to the OR-gates 30 and 33. Depending on the position of the switch 145 the counter 3 is fed either with the "000...0" or with the "111...1" code which is stored in the buffer memory 5 in an ordinary way. If in this case the switch 148 is open, the device will be stopped by an overflow signal arriving via the OR-gates 41 after the counter 4 is filled up. This mode is used to erase the information stored in the buffer memory 5.

If the switch 148 is closed, the signal from the OR-gate 30, appearing at the moment when the code in the counter 4 reached the number preset by the switch 65 will pass the delay circuit 150 and gate 149 to be applied to the OR-gate 45. This mode is used to check whether the buffer memory 5 and the ordinate group read-out circuit operate correctly.

To check whether the device performs the reading out process correctly, the start-stop mode of operation is used. The device will operate in this mode after the switch 141 is closed. In this case pulses from the oscillator 139 are fed to the gate 143 controlled by the decoder 75 via the switch 65. The switch 65 should be operated to the position corresponding to the number of the curve whose ordinate is to be measured. Then the device is started. At the moment when the code in the counter 4 coincides with the number of the curve that is being read, the gate 143 will open, the signal from the oscillator 139, having passed to gate 143, will make the trigger, 10 to change to "0" and, via the OR-gate 41, will stop the device. The ordinate counter 3 will now have a code equal to the ordinate of the curve which is being read.

To insure the automatic mode of sampling pitch switchover, the operator, before starting the device, should operate the switch 117 (FIG. 2) to the position of the required reading pitch value and the switch 118 to the position of the required sampling pitch before the point of curve intersection. At the moment of the start of the device the start signal will pass the OR-gate 123, gate 121, switch 117 and the preset numbers circuit 114 to introduce into the counter 113 an additional code number corresponding to the reading pitch. When the counter 113 is complete with signals from the photoelectric cell 6 the voltage input of the gate 21 controlled by the counter 113 will open. Only after that will the successive pulse coming from the photoelectric cell 6 via the gate 21 allow the device to start operating in accordance with the preset program. A signal to stop the reading procedure will drop the counter 113 to zero.

Hence, the device continues operating in the normal mode, i.e., the curves are being read off with a certain fixed pitch, until the critical approach signal appears. When curves approach one another to the critical distance, the trigger 70 will change to "1", the gate 121 will open, the stop-reading signal from the OR-gate 45 will pass through the OR-gate 123, gate 121, switch 118 and through the preset numbers circuit 114 and will feed the counter 113 with a new code corresponding to the sampling pitch in the critical approach zone. After that the device will continue operating in its normal mode.

The operation of the device in the mode insuring the elimination of timing mark reading errors and the reversing of the direction of the tape movement is as follows. The start signal passing the OR-gate 128 (FIG. 3) makes the trigger 124 change to "0". As soon as the tape starts moving a signal produced by the photoelectric cell 126 after it reads out the timing marks will pass the OR-gate 138 and make the trigger 124 change to "1". A signal produced by the photoelectric cell 99 will pass the gate 98 to the counter 96 and then, through the delay circuit 127 and the OR-gate 128, will make the trigger 124 change to "0". The device will continue operating until the code in the counter 96 is equal to the number preset set by switch 131. After that, the gate 133 will open and the signal from the pulse shaper 134 will make the trigger 125 change to "0". This event serves as a command for the tape transport motor to reverse. The same signal makes the trigger 124 change to "0".

After the tape direction is reversed the photoelectric cell 126 will read the timing mark for the second time and produce a signal which, via the gate 133, will make the trigger 125 change to "1". The signal from the 1-output of the trigger 125 will pass through the OR-gates 136, 138 to the 1-input of the trigger 124, thus making the device ready for the next phase of operation.

The device for reading multichannel oscillograms provided by the present invention possesses a number of basically new properties, such as means for automatic sensitivity adjustment of the recorded line registration channel; means for adjusting for curve critical approach gap; means for grouping the data which are fed into the computer; means for measuring and generating signals indicative of timing marks; means for automatic adjustment of the sampling pitch along the tape in accordance with the nature of the recorded processes and means for eliminating reading errors caused by the continuous way of the tape transportation. Therefore, it becomes possible to design and build curve reading devices with high performance characteristics, and, primarily to remove the contradiction that exists between high speed computers and low devices for reading graphic information. If the curve reading device and the computer use similar components, the rate of curve ordinate data input can be raised up to the rate at which codes are introduced into the internal memory of the computer. Since the requirements for automatic graphic information processing are quite high in various fields of science and technology, it is advisable that the device for reading multichannel oscillograms provided by the present invention should be included as an additional input unit into the set of an electronic computer. This will represents a total solution of the problem of automatic input and processing of multichannel oscillograms and other visual curves recorded on paper tapes, photographic and cine films in an electronic computer. Besides, it will be considerably broaden the operating possibilities of computers themselves.

While the present invention has been described above in connection with its preferred embodiment, those skilled in the art will easily understand that there can exist modifications and versions thereof without departing from the concept and scope of the invention.

These modifications and versions are to be constructed as included into the spirit and scope of the invention and the appended claims.

What is claimed is:

1. A device for reading multichannel oscillograms recorded on information-carrying tapes which comprises a unit for recorded lines registering, photoelectric cells for registering the beginning and end of the reading zone and the recorded lines in said unit for recorded lines registering, a driving pulse oscillator, an ordinate counter connected to said driving pulse oscillator, a reversible counter of the number of oscillographic curves, a decoder of said reversible counter, a selector of the number of oscillographic curves of said reversible counter, a buffer memory operating in conjunction with said ordinate counter and said reversible counter of the number of oscillographic curves, means for automatic adjustment of the sensitivity of an amplifier in said recorded line registration photoelectric cell, said means having gates which feed said photoelectric cell amplifier with preset bias voltages, a counter of measurement errors, a decoder of said error counter whose output buses are connected to control inputs of said bias voltage feeding gates, a pulse shaper whose input is connected to the central contact of said selector of the number of oscillographic curves, a trigger whose 1-input is connected to the output of said pulse shaper, a gate controlled by said trigger whose input is connected to said photoelectric cell registering the end of the reading zone and whose output is connected to the 0-input of said trigger which controls said gate and to the complementing input of said counter of measurement errors whereby signals indicative of said oscillograms are generated.

2. A device as claimed in claim 1, provided with means for producing signals indicative of the zone where the gap between oscillographic curves becomes critical, said means comprising: a curve approach trigger whose 1-input is connected to the output of said amplifier of the recorded line registration photoelectric cell which generates a signal at the moment when the scanning beam passes the front edge of the curve that is being read, a first gate whose control input is connected to the 1-output of said curve approach trigger and whose second input is connected to said first output of the amplifier of the photoelectric cell, a second gate whose control input is connected to the 1-input of said curve approach trigger, and whose second input is connected to the second output of said amplified of the photoelectric cell which generates a signal at the moment when the scanning beam passes the rear edge of the curve that is being read; an adjustable delay circuit whose input is connected to the output of said second gate and whose output is connected to the 0-input of said curve approach trigger; a curve extrapolation trigger whose 1-input is connected to the output of said first gate.

3. A device as claimed in claim 1, provided with means for grouping data on the ordinates of curves that have been read off the tape and for feeding said data to an electronic computer for further processing, the means comprising: an inverter whose input is connected to the 0-bus of said decoder of the reversible counter; an initiation gate whose control input is connected to the output of said inverter and whose second input is connected to the interrogation bus of the computer which is being fed with the read-off graphical information; a first delay circuit; a circuit cycling gate whose control input is connected to the output of said inverter, whose second input is connected to the output of the first delay circuit and whose output is connected to the subtract input of said reversible counter; a second delay circuit whose output is connected to the input of the first delay circuit and to the 0-inputs of said ordinate counter; an OR-gate whose inputs are connected to the outputs of said circuit initiation and circuit operation cycling gates and whose output is connected to the input of said second delay circuit; a third delay circuit whose input is connected to the output of the second delay circuit and whose output is connected to the interrogation bus of said buffer memory; a supplementary gate controlled by signals from the 0-bus of said decoder of the reversible counter and connected by its output to the start bus of the computer, the outputs of said buffer memory being connected to the 1-inputs of said ordinate counter and its control buses being connected, via switches, to the output buses of said decoder of the reversible counter.

4. A device as claimed in claim 1, provided with means for counting timing marks and generating signals indicative thereof, which comprises: a photoelectric cell registering timing marks; a timing mark counter; gates producing signals indicative of the number of timing marks, the gates being controlled by said timing mark counter, the pulse inputs of the gates being connected to the output of the ordinate readiness gate and the outputs of the gate being connected to the 1-inputs of said ordinate counter; a supplementary gate controlled by signals from the start trigger, the input of said gate being connected to said timing mark registration photoelectric cell and the output of said gate being connected to the complementing input of said timing mark gate being connected to the complementing of said timing mark counter and to the 1-input of the second start trigger which controls the blocking of said photoelectric cells registering the beginning and end of the reading zone and the recorded lines.

5. A device as claimed in claim 2, comprising: means for controlling the sampling pitch including a counter whose complementing input is connected to said photoelectric cell registering the beginning of the reading zone; supplementary switches whose terminals are connected to the 1-inputs of said sampling pitch counter; supplementary gates which are controlled by 0- and 1-inputs of said extrapolation trigger, the output of the gates being connected to the common point of said supplementary switches; an OR-gate whose inputs are connected to the start bus of the device and to the photoelectric cell registering the end of the reading zone and whose output is connected to said supplementary gates; a start gate, the first input of which is connected to the 1-output of said sampling pitch counter, the second input of which is connected to the 1-input of said start trigger and the third input of which is connected to said photoelectric cell registering the beginning of the reading zone.

6. A device as claimed in claim 4, comprising: a second photoelectric cell registering timing marks, the cell being located at a certain distance from said first photoelectric cell registering timing marks; a timing mark trigger whose 1 input is connected to the output of said second photoelectric cell registering timing marks; a gate controlling said timing mark trigger whose input is connected to the output of said first photoelectric cell registering timing marks and whose output is connected to the complementing input of said timing mark counter; a delay circuit whose input is connected to the output of said gate and whose output is connected to the 0-input of said timing mark trigger; a switch whose terminals are connected to the output buses of the decoder of said timing mark counter; a pulse shaper whose input is connected to the common point of said switch; a reversing trigger whose 0-input is connected to the output of said pulse shaper and whose outputs are connected to the inputs of said timing mark trigger and to the unit which controls the rotation of the drive motor transporting the tape with the recorded oscillogram; a supplementary gate the first input of which is connected to said common point of the switch the second input of which is connected to said second photoelectric cell and the output of which is connected to the 1-input of said reversing trigger.

* * * * *